United States Patent
Brooker et al.

(10) Patent No.: US 9,891,585 B2
(45) Date of Patent: Feb. 13, 2018

(54) INCOHERENT FLUORESCENCE DIGITAL HOLOGRAPHIC MICROSCOPY USING TRANSMISSION LIQUID CRYSTAL LENS

(71) Applicant: Gary Brooker, Rockville, MD (US)

(72) Inventors: Gary Brooker, Rockville, MD (US); Nisan Siegel, Silver Spring, MD (US); Joseph Rosen, Omer (IL)

(73) Assignee: CellOptic, Inc., Rockville, MD (US)

( * ) Notice: Subject to any disclaimer, the term of this patent is extended or adjusted under 35 U.S.C. 154(b) by 0 days.

(21) Appl. No.: 15/026,785

(22) PCT Filed: Sep. 29, 2014

(86) PCT No.: PCT/US2014/058138
§ 371 (c)(1),
(2) Date: Apr. 1, 2016

(87) PCT Pub. No.: WO2015/050827
PCT Pub. Date: Apr. 9, 2015

(65) Prior Publication Data
US 2016/0246255 A1    Aug. 25, 2016

Related U.S. Application Data

(60) Provisional application No. 61/886,064, filed on Oct. 3, 2013.

(51) Int. Cl.
*G03H 1/04* (2006.01)
*G03H 1/06* (2006.01)
(Continued)

(52) U.S. Cl.
CPC ....... *G03H 1/0443* (2013.01); *G02B 21/0068* (2013.01); *G02B 21/16* (2013.01);
(Continued)

(58) Field of Classification Search
CPC ........ G03H 1/0443; G03H 1/041; G03H 1/06; G03H 5/00; G03H 2001/005;
(Continued)

(56) References Cited

U.S. PATENT DOCUMENTS 6,781,763 B1    8/2004    Tamburino et al.
8,824,063 B2    9/2014    Okawa et al.
(Continued)

FOREIGN PATENT DOCUMENTS

EP    2 631 909 A1    8/2013
JP    2002-365589 A    12/2002
(Continued)

OTHER PUBLICATIONS

International Search Report for PCT/US2014/058138, dated Dec. 19, 2014, 2 pages.
(Continued)

*Primary Examiner* — Nicole Ippolito
*Assistant Examiner* — Hanway Chang
(74) *Attorney, Agent, or Firm* — Nixon & Vanderhye, P.C.

(57) ABSTRACT

A new optical arrangement that creates high efficiency, high quality Fresnel Incoherent Correlation Holography (FINCH) holograms using transmission liquid crystal GRIN (TL-CGRIN) diffractive lenses has been invented. This is in contrast to the universal practice in the field of using a reflective spatial light modulator (SLM) to separate sample and reference beams. Polarization sensitive TLCGRIN lenses enable a straight optical path, have 95% transmission efficiency, are analog devices without pixels and are free of many limitations of reflective SLM devices. An additional advantage is that they create an incoherent holographic system that is achromatic over a wide bandwidth. Two spherical beams created by the combination of a glass and a
(Continued)

polarization sensitive TLCGRIN lenses interfere and a hologram is recorded by a digital camera. FINCH configurations which increase signal to noise ratios and imaging speed are also described.

18 Claims, 4 Drawing Sheets

(51) Int. Cl.
  *G02B 21/00* (2006.01)
  *G02B 21/16* (2006.01)
  *G03H 5/00* (2006.01)
  *G03H 1/00* (2006.01)

(52) U.S. Cl.
  CPC ............... *G03H 1/041* (2013.01); *G03H 1/06* (2013.01); *G03H 5/00* (2013.01); *G03H 2001/005* (2013.01); *G03H 2001/0447* (2013.01); *G03H 2222/24* (2013.01); *G03H 2222/31* (2013.01); *G03H 2223/22* (2013.01); *G03H 2225/22* (2013.01)

(58) Field of Classification Search
  CPC ....... G03H 2001/0447; G03H 2222/24; G03H 2222/31; G03H 2223/22; G03H 2225/22; G02B 21/0068; G02B 21/16
  USPC ...................................................... 250/505.1
  See application file for complete search history.

(56) References Cited

U.S. PATENT DOCUMENTS

| | | |
|---|---|---|
| 2007/0127348 A1 | 6/2007 | Ooi et al. |
| 2007/0285753 A1 | 12/2007 | Huang et al. |
| 2010/0020669 A1 | 1/2010 | Ayres |
| 2012/0050832 A1 | 3/2012 | Rosen et al. |
| 2013/0215730 A1 | 8/2013 | Okamoto et al. |

FOREIGN PATENT DOCUMENTS

| | | |
|---|---|---|
| JP | 2013-041000 A | 2/2013 |
| JP | 2013-104964 A | 5/2013 |
| WO | WO 2012/053198 A1 | 4/2012 |
| WO | WO 2013/068882 | 5/2013 |

OTHER PUBLICATIONS

Written Opinion of the ISA for PCT/US2014/058138, dated Dec. 19, 2014, 4 pages.
Rosen et al., "Theoretical and Experimental Demonstration of Resolution Beyond the Rayleigh Limit by FINCH Fluorescence Microscopic Imaging", Optics Express, 2011, vol. 19, pp. 26249-26268.
Hashimoto et al., "Liquid Crystal Quantized GRIN Lens and its Application to AF Systems", SPIE, vol. 7232, p. 72320N-8, XP55284247 dated Feb. 12, 2009.
Rosen et al., "Fresnel Incoherent Correlation Holography (FINCH): A Review of Research", Advanced Optical Technologies, vol. 1, No. 3, pp. 151-169 of Jul. 1, 2012, XP55284206.
European Search Report EP 14 85 1007 dated Apr. 19, 2017.

INCOHERENT FLUORESCENCE DIGITAL HOLOGRAPHIC MICROSCOPY USING TRANSMISSION LIQUID CRYSTAL LENS

CROSS-REFERENCE TO RELATED APPLICATIONS

This application is a national phase application under 35 U.S.C. § 371 of intentional application no. PCT/US2014/058138 filed on Sep. 29, 2014, which designates the U.S., and which claims the benefit of priority to U.S. Provisional Application Ser. No. 61/886,064, filed Oct. 3, 2013. Each of the applications PCT/US2014/058138 and 61/886,064 are hereby incorporated by reference in its entirety.

GOVERNMENT RIGHTS

This invention was made with U.S. government support under grant 60NANB10D008 awarded by the National Institute of Standards and Technology (NIST). The U.S. government has certain rights in the invention.

BACKGROUND

1. Field

The present specification relates to Fresnel Incoherent Correlation Holography (FINCH).

2. Description of the Related Art

Ever since Fresnel Incoherent Correlation Holography (FINCH) (J. Rosen and G. Brooker, "Digital spatially incoherent Fresnel holography" Opt. Lett. 32, 912-914 (2007)) showed its potential for fluorescence microscopy (J. Rosen and G. Brooker, "Non-scanning motionless fluorescence three-dimensional holographic microscopy" Nat. Photonics 2, 190-195 (2008)), we have sought to perfect the technique into a useful high resolution 3D imaging method. The concept that a 3D image could be obtained from incoherent sources by a holographic process, without lasers, scanning or axial translation or the need to capture images at multiple planes of focus to create a 3D image is appealing. The field has now advanced as a result of additional work from our group (G. Brooker, N. Siegel, V. Wang, and J. Rosen, "Optimal resolution in Fresnel incoherent correlation holographic fluorescence microscopy," Opt. Express 19, 5047-5062 (2011); J. Rosen, N. Siegel, and G. Brooker, "Theoretical and experimental demonstration of resolution beyond the Rayleigh limit by FINCH fluorescence microscopic imaging," Opt. Express 19, 26249-26268 (2011); B. Katz, J. Rosen, R. Kelner, and G. Brooker, "Enhanced resolution and throughput of Fresnel incoherent correlation holography (FINCH) using dual diffractive lenses on a spatial light modulator (SLM)," Opt. Express 20, 9109-9121 (2012); N. Siegel, J. Rosen, and G. Brooker, "Reconstruction of objects above and below the objective focal plane with dimensional fidelity by FINCH fluorescence microscopy," Opt. Express 20, 19822-19835 (2012)) and other laboratories (P. Bouchal, J. Kapitan, R. Chmelik, and Z. Bouchal, "Point spread function and two-point resolution in Fresnel incoherent correlation holography," Opt. Express 19, 15603-15620 (2011); X. Lai, Y. Zhao, X. Lv, Z. Zhou, and S. Zeng, "Fluorescence holography with improved signal-to-noise ratio by near image plane recording," Opt. Lett. 37, 2445-2447 (2012); O. Bouchal and Z. Bouchal, "Wide-field common-path incoherent correlation microscopy with a perfect overlapping of interfering beams," J. Europ. Opt. Soc.—Rap. Pub. 8, 13011 (2013)) including the demonstration that the FINCH optical system is inherently super-resolving (J. Rosen, N. Siegel, and G. Brooker, "Theoretical and experimental demonstration of resolution beyond the Rayleigh limit by FINCH fluorescence microscopic imaging," Opt. Express 19, 26249-26268 (2011).; B. Katz, J. Rosen, R. Kelner, and G. Brooker, "Enhanced resolution and throughput of Fresnel incoherent correlation holography (FINCH) using dual diffractive lenses on a spatial light modulator (SLM)," Opt. Express 20, 9109-9121 (2012); N. Siegel, J. Rosen, and G. Brooker, "Reconstruction of objects above and below the objective focal plane with dimensional fidelity by FINCH fluorescence microscopy," Opt. Express 20, 19822-19835 (2012)) Recently it has been shown that the reason for this is that FINCH overcomes the Lagrange invariant (X. Lai, S. Zeng, X. Lv, J. Yuan, and L. Fu, "Violation of the Lagrange invariant in an optical imaging system," Opt. Lett. 38, 1896-1898 (2013) [10]).

Common to all previous studies involving the FINCH technique has been the use of spatial light modulator (SLM) devices to act as in-line beam splitters to separate the reference and sample beams coincident within a single axis except for the system suggested by Kim (M. K. Kim, "Full color natural light holographic camera," Opt. Express, 21, 9636-9642 (2013)) which operate like FINCH but are based on a Michelson-like interferometer without an SLM. Unfortunately this arrangement is difficult to setup, is sensitive to vibration since it is based upon a two optical beam interferometer, rather than the single beam FINCH concept in which both reference and sample beam paths traverse a coincident optical path. Furthermore the Kim approach has not been shown to produce high quality images.

SLM devices are usually liquid crystal deposited on a reflective semiconductor pixel matrix. Because of the reflective nature of the devices, they must be used at an angle to reflect the processed beam, complicating optical configurations. Furthermore, their resolution is dependent upon the pixel density of the devices and because they are pixelated, light is diffracted into many orders which significantly reduces light efficiency and results in unwanted image reflections. Even greater light loss is observed if they are used on axis with a beam splitting cube to try and overcome some of these limitations (G. Brooker, N. Siegel, V. Wang, and J. Rosen, "Optimal resolution in Fresnel incoherent correlation holographic fluorescence microscopy," Opt. Express 19, 5047-5062 (2011); O. Bouchal and Z. Bouchal, "Wide-field common-path incoherent correlation microscopy with a perfect overlapping of interfering beams," J. Europ. Opt. Soc.—Rap. Pub. 8, 13011 (2013)). Other image degrading characteristics include, for example, the small aperture size of the devices, astigmatic properties and their limited dynamic range. Thus SLM devices inherently reduce light throughput and fidelity, affecting the ultimate resolution of holograms and thus the reconstructed images.

In this specification, in order to overcome these limitations, the Applicants have invented a new high performance optical system for FINCH which operates in a straight line optical path with about 90% transmission efficiency in the creation of the sample and reference beams, is pixel free and devoid of other limitations of a SLM. The SLM is replaced in this new FINCH configuration with a polarization sensitive transmission liquid crystal GRIN lens (TLCGRIN) (N. Hashimoto and M. Kurihara, Proc. of SPIE 7232, 72320N-1-8 (2009)) in combination with an achromatic glass lens. This liquid crystal GRIN lens is combined with a glass lens to create, from each incoherent sample point, two converging, orthogonally polarized waves so that an in-line reference and sample beam could interfere and thus create a hologram. Since TLCGRIN lenses are polarization sensitive analog electro-optic devices which create high resolution lenses, we were able to adapt them to this new FINCH configuration and overcome the previous functional limitation of SLM based FINCH devices. In some versions of this arrangement a transmission liquid crystal Fresnel lens could be substituted for the TLCGRIN lens, however the TLCGRIN lenses are preferred because of their tunability and superior optical properties.

BRIEF SUMMARY

A new optical arrangement that creates high efficiency, high quality Fresnel Incoherent Correlation Holography (FINCH) holograms using transmission liquid crystal GRIN (TLCGRIN) diffractive lenses has been invented. This is in contrast to the universal practice in the field of using a reflective spatial light modulator (SLM) to separate sample and reference beams. Polarization sensitive TLCGRIN lenses enable a straight optical path, have 95% transmission efficiency, are analog device without pixels and are free of many limitations of reflective SLM devices. An additional advantage is that they create an incoherent holographic system that is achromatic over a wide bandwidth. Two spherical beams created by the combination of a glass and a polarization sensitive TLCGRIN lenses interfere and a hologram is recorded by a digital camera.

In one embodiment, an apparatus for producing a hologram includes a collimation lens configured to receive incoherent light emitted from an object; a TLCGRIN lens that includes at least one diffractive lens which is configured to receive the incoherent light from the collimation lens and split the incoherent light into two beams that interfere with each other; and a camera configured to record the interference pattern of the two beams to create a hologram, wherein a ratio between a distance from the TLCGRIN lens to the camera and a focal length of the diffractive lens is greater than 1.

In another embodiment, a system configured to examine a sample by both regular microscopy and Fresnel Incoherent Correlation Holography (FINCH) includes a polarization sensitive beam splitter in the path of light emitted from an incoherent light emitting object (that emits mixed polarization) so that the system can simultaneously perform regular and holographic microscopy, in which one polarization state passes through the TLCGRIN lens system and records the holographic image on one camera and the other polarization state is directed to another camera to record the regular microscope image.

DETAILED DESCRIPTION

Figure 1:
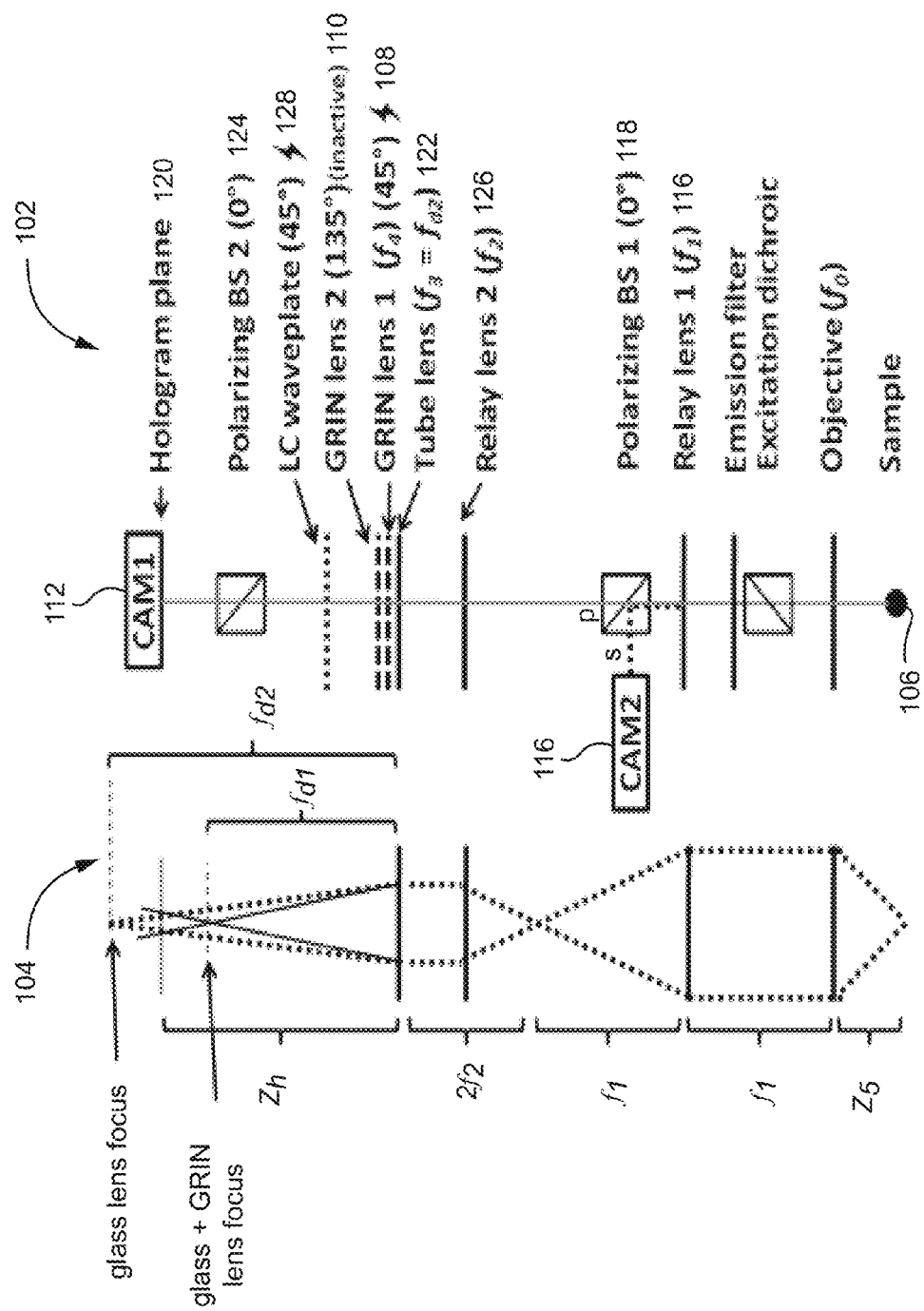
FIG. 1. shows a schematic of the FINCH fluorescence microscope 102 using TLCGRIN lens. On the left side of the figure is depicted the ray diagram 104 for a FINCH hologram of a point. BS stands for polarizing beamsplitter, $f_0$-$f_4$ are the focal lengths of the objective lens, first and second relay lenses, tube lens and TLCGRIN lens 1, respectively. TLCGRIN lens 2 is inactive and placed orthogonal to active TLCGRIN lens 1. The sample is located at distance $z_s$ from the objective lens, and the holography camera CAM1 is located at distance $z_h$ from the tube lens, as described in the text. The widefield camera, CAM2 is located at distance $f_1$ from the first relay lens and views the rejected polarization component (s polarization axis) from BS1 cube. Distances are corrected to account for the optical path through the glass of the BS cubes. The hologram plane is midway between the focus of the glass tube lens and its reduced focal length due to combination with the polarized component of the TLCGRIN lens. Axis orientation values (in degrees) are given with respect to the p polarization of the first BS.

The optical setup of this transmission FINCH microscope differs markedly from previous reflection models such that holograms can be captured with high optical efficiency in a straight-line optical setup, while at the same time, the microscope widefield image can be simultaneously viewed in real-time. The reflective SLM function is replaced by the combination of a glass lens and polarization sensitive TLCGRIN lens. The inefficient plate polarizing filters are replaced by polarizing beamsplitter (BS) cubes (e.g., FIG. 1 118, 124) (Thorlabs CM1-PBS251). The polarizing BS cubes offer almost 100% transmission of each polarization axis and thus yield significantly higher light throughput of the desired polarization. Holograms are captured by CAM1 (e.g., FIG. 1 102) at the end of the p polarization axis and the previously wasted s polarization beam is used to view the widefield microscope image through a second camera (CAM2, e.g., FIG. 1 114) (or binocular mounted on the first polarizing beam splitting cube). This arrangement allows for the real-time viewing or capture of microscope specimens to focus the microscope or capture comparative widefield images as shown in FIG. 1. In the hologram recording p polarization path, the back aperture of the objective is projected directly onto the tube lens (e.g., 122) by use of a 4f relay (O. Bouchal and Z. Bouchal, "Wide-field common-path incoherent correlation microscopy with a perfect overlapping of interfering beams," J. Europ. Opt. Soc. —Rap. Pub. 8, 13011 (2013)). In this implementation we have taken the additional step of using a magnifying relay with the first relay lens (e.g., FIG. 1 116) having an/1=80 mm focal length while the second relay lens (e.g., FIG. 1 128) had a $f_2$=50 mm focal length. This magnifying step decreased the object pixel size while also shrinking the point hologram size, improving the signal to noise ratio of hologram recording. Recall that the FINCH image magnification without the relay unit is $z_h/f_o$ (J. Rosen, N. Siegel, and G. Brooker, "Theoretical and experimental demonstration of resolution beyond the Rayleigh limit by FINCH fluorescence microscopic imaging," Opt. Express 19, 26249-26268 (2011); B. Katz, J. Rosen, R. Kelner, and G. Brooker, "Enhanced resolution and throughput of Fresnel incoherent correlation holography (FINCH) using dual diffractive lenses on a spatial light modulator (SLM)," Opt. Express 20, 9109-9121 (2012); N. Siegel, J. Rosen, and G. Brooker, "Reconstruction of objects above and below the objective focal plane with dimensional fidelity by FINCH fluorescence microscopy," Opt. Express 20, 19822-19835 (2012)), the present overall magnification of the system is $(f_1 z_h)/(f_2 f_o)$, where $z_h$ is the distance between the tube lens (e.g., FIG. 1 122) and the image plane (e.g., FIG. 1 120). The relay lenses FIGS. 1 116 and 126) were achromatic imaging lenses (Rodagon 452341, 452315 respectively) selected to maintain flatness of the image through the relay. The first polarizing BS cube (e.g., FIG. 1 118) was internal to the relay, and directed the rejected s polarization onto the secondary widefield camera (e.g., FIG. 1 114) (The Imaging Source DMK23GP031) which was at the focus of the first relay lens (e.g., FIG. 1 116). The distance between the relay lenses (e.g., FIGS. 1 116 and 126) was corrected for the presence of the BS glass during laser alignment of the system. The tube lens (e.g., FIG. 1 122) was located at the output focus of the 4f relay. Referring to FIG. 1, the sample beam is focused at distance $f_{d1}$ while the reference beam is focused at $f_{d2}$. The tube lens combines with the active TLCGRIN lens (e.g., FIG. 1 108) to focus an image at the $f_{d1}$ plane, where $f_{d1}=f_3 f_4/(f_3+f_4)$, while the $f_{d2}$ plane is focused only by the tube lens at distance $f_3$. The value of $z_h$ for maximum overlap of the sample and reference beams is fixed by $f_{d1}$ and $f_{d2}$ as follows: $z_h=f_{d1}(1+s_{fac})=f_{d2}(1-s_{fac})$, where $s_{fac}=(f_{d2}-f_{d1})/(f_{d2}+f_{d1})$. We used a variable focal length TLCGRIN lens (N. Hashimoto and M. Kurihara, "Liquid crystal quantized GRIN lens and its application to AF systems," Proc. of SPIE 7232, 72320N-1-8 (2009)) with a focal range of 5000 mm to infinity. We operated the TLCGRIN lens at its minimum focal length of 5000 mm by driving it with a 1 kHZ square wave pulse of about 2v RMS and used a 300 mm 2" achromatic lens (Thorlabs AC508-300-A) as the tube lens, resulting in $f_{d1}$ of 283 mm, $f_{d2}$ of 300 mm and $z_h$ of 291.3 mm. This corresponds to a spacing factor $s_{fa}$ (N. Siegel, J. Rosen, and G. Brooker, "Reconstruction of objects above and below the objective focal plane with dimensional fidelity by FINCH fluorescence microscopy," Opt. Express 20, 19822-19835 (2012)) of 0.03, well within the range of optimal spacing of the focal and hologram planes. In addition to the TLCGRIN lens (e.g., FIG. 1 108) used for creating the hologram, another (inactive) compensating TLCGRIN lens (e.g., FIG. 1 110) was used, with a polarization axis perpendicular to the active TLCGRIN lens, to correct for the optical path difference (OPD) in the TLCGRIN lens as is discussed later. An electronically variable waveplate polarized parallel to the active TLCGRIN lens (p polarization) was used to effect the $2\pi/3$ phase shifts necessary for twin image and zero-order elimination (J. Rosen and G. Brooker, "Digital spatially incoherent Fresnel holography" Opt. Lett. 32, 912-914 (2007)). The second polarizing BS cube (e.g., FIG. 1 124) was positioned after the waveplate (e.g., FIG. 1 128), and was polarized parallel to the first BS cube (e.g., FIG. 1 118). The hologram recording camera (e.g., FIG. 1 112), a Hamamatsu ORCA-Flash 4 CMOS camera, was at the $z_h$ distance of 291.3 mm away from the tube lens (e.g., FIG. 1 122). The objective used was a Nikon 20×0.75 NA. Various standard microscope filter sets were used (Semrock or Thorlabs) as indicated in the figures and fluorescent illumination was from a Photo-fluor II illuminator (89 North) with excitation filters placed in the internal filter wheel and the excitation light delivered to the microscope through a liquid light guide. The signal generators, excitation light source and cameras were controlled by software written in LabView (National Instruments) in which the calculations were done as well. The TLCGRIN lens voltage was maintained constant to create a predetermined focal length and the voltage to the liquid phase plate was changed three times to create the required $2\pi/3$ phase shifts during each hologram capture routine. Images were reconstructed from the holograms using a Hamming-windowed point spread function for propagation to the reconstruction distance (N. Siegel, J. Rosen, and G. Brooker, Opt. Lett. 38, 3922-3925 (2013).

Figure 2:
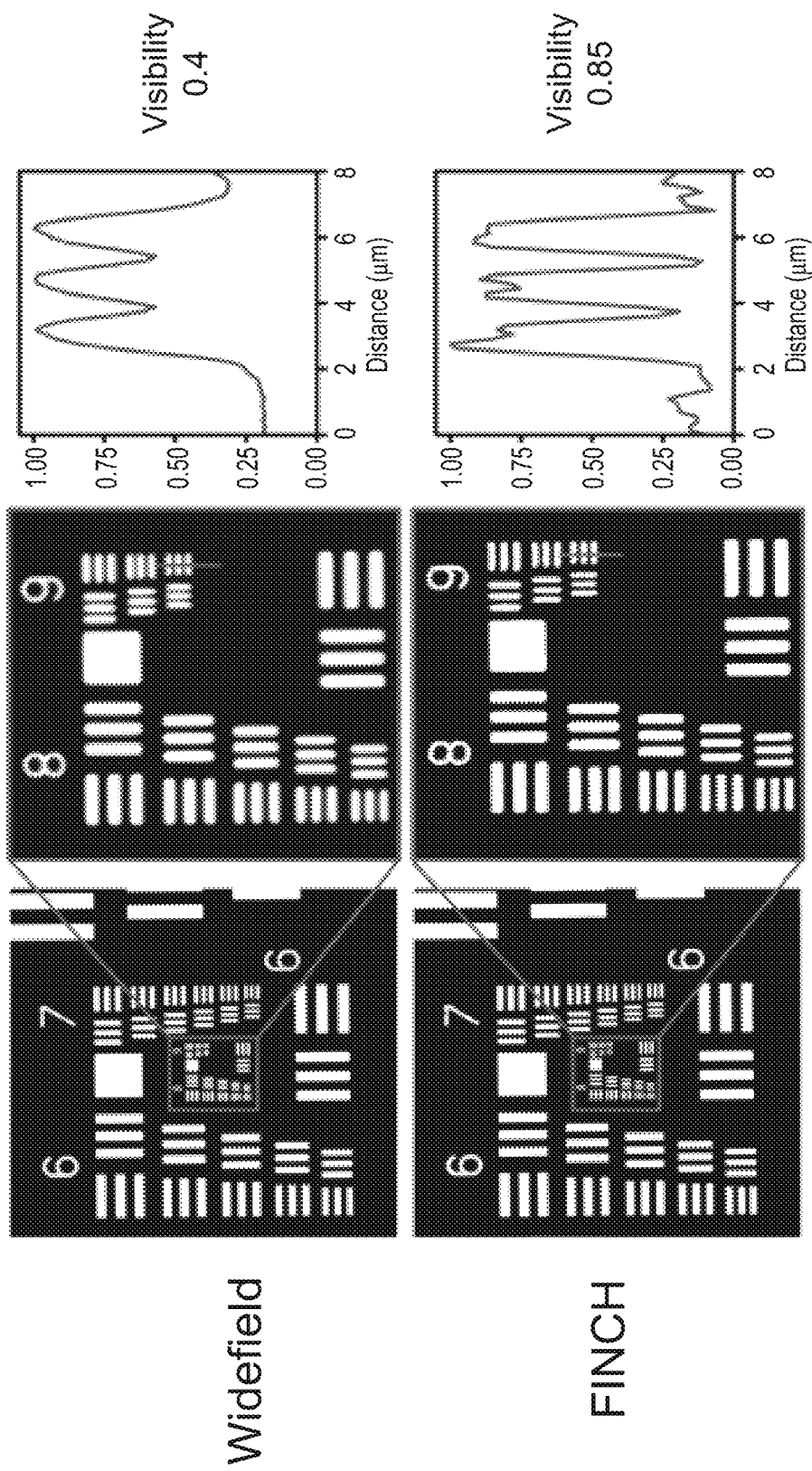
FIG. 2 shows a fluorescent USAF resolution pattern imaged by widefield (top row) and FINCH fluorescence microscopy using the TLCGRIN lens system (bottom row) with a 20×, 0.75 NA objective and GFP filter set (525 nm emission). Left panels are the whole field of view (285 microns on a side), center panels show enlarged group 8 and 9 features with the smallest features in group 9 approaching the resolution limit. The far right panels show the line profile intensity through the smallest group 9 features. The visibility with FINCH using the TLCGRIN lens system is increased about 2 fold when compared to widefield imaging.
Figure 3:
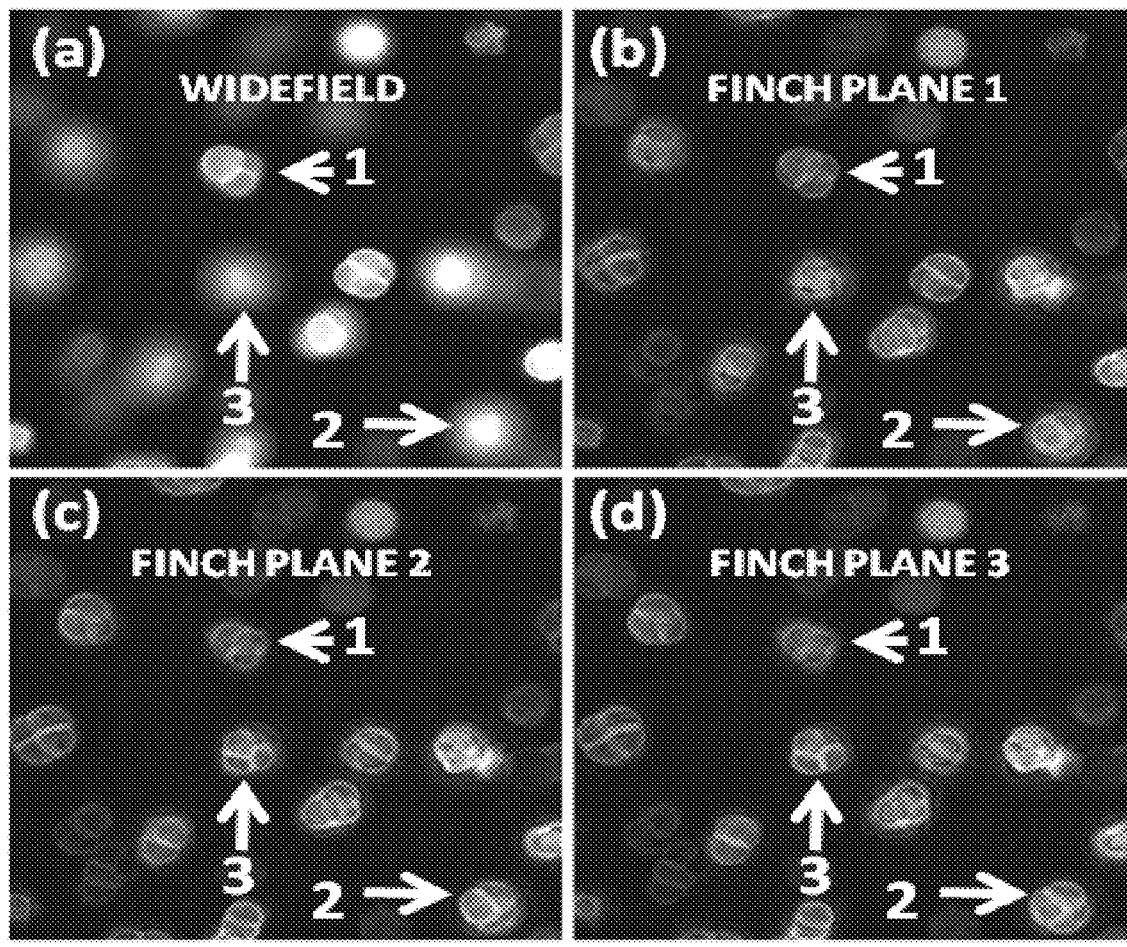
FIG. 3 shows (a) widefield and (b-d) reconstructed TLCGRIN lens FINCH images of pollen grains captured using a 20× (0.75 NA) objective, showing the ability of TLCGRIN lens FINCH to refocus at depths that were out of focus under widefield conditions. Each full field image is 285 microns square.

The performance of this new FINCH configuration is demonstrated in images shown in FIGS. 2 and 3. The standard USAF resolution slide which is fluorescent due to a fluorescent backing, was imaged as shown in FIG. 2 with the new setup. The widefield image of the smallest group 9 features has visibility similar to those previously reported (J. Rosen, N. Siegel, and G. Brooker, "Theoretical and experimental demonstration of resolution beyond the Rayleigh limit by FINCH fluorescence microscopic imaging," Opt. Express 19, 26249-26268 (2011)). Reconstruction of holograms obtained by the new method showed about a twofold improvement in visibility over coherent holography as reported for previous versions of FINCH. However, close examination of the images reveal much greater clarity and the holography exposure times were reduced about 4 fold because of the better overall light efficiency of the system. Pollen grains are more complex objects and were readily imaged with the new FINCH configuration by both widefield and holography to observe the 3D nature of the specimen. FIG. 3a shows one widefield plane while FIG. 3b-d show multiple planes of focus observed by FINCH. The FINCH images are of equal or better quality when compared to the widefield image at all planes observed.

Figure 4:
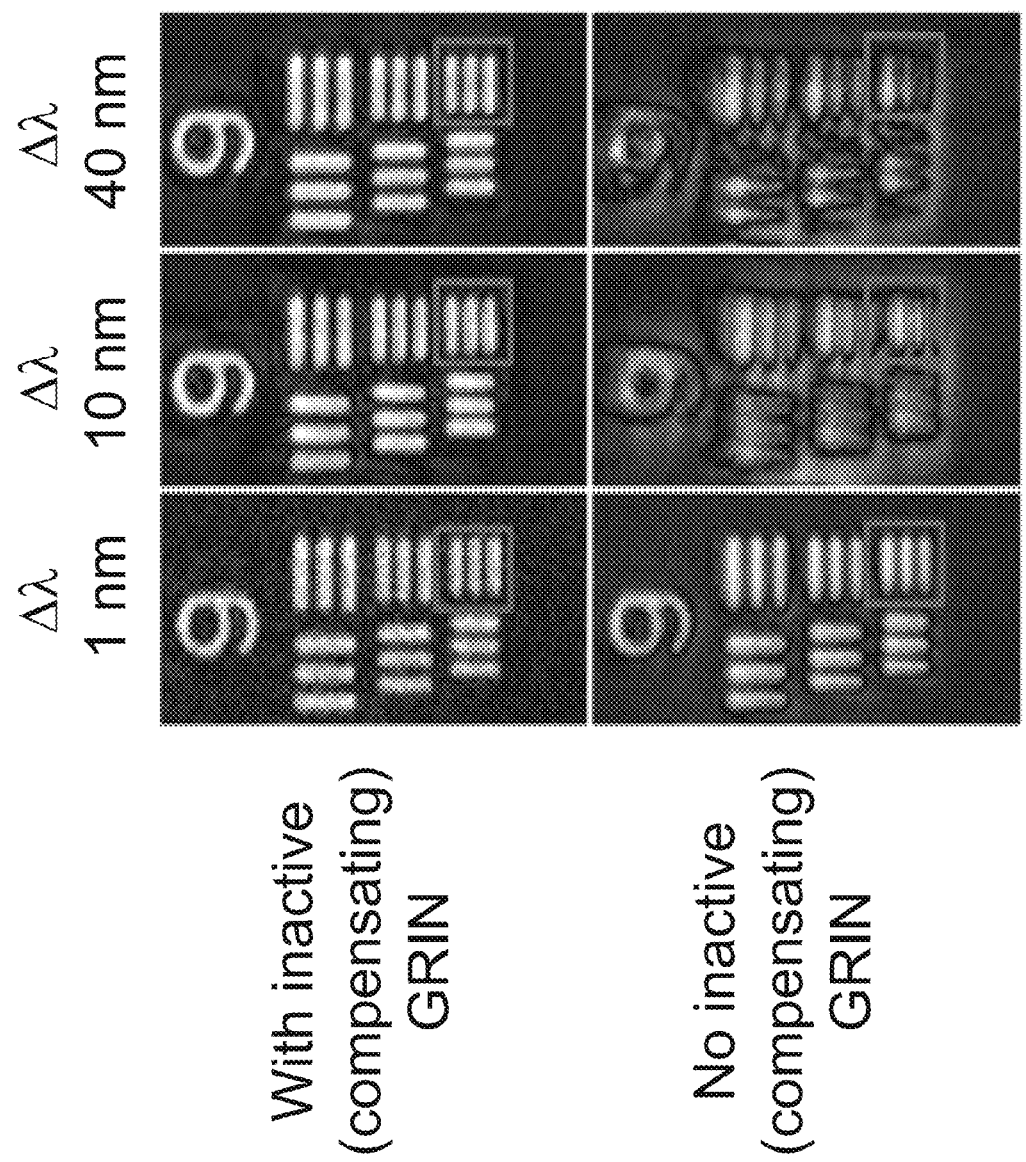
FIG. 4 shows the effect of bandwidth on visibility of group 9 features in a USAF test slide with and without a compensating TLCGRIN lens placed orthogonal to the active TLCGRIN lens. Top row with compensation at 1, 10 and 40 nm bandwidth, visibilities were 0.73, 0.65 and 0.69 respectively. Bottom row without compensation at 1, 10 and 40 nm bandwidth, visibilities were 0.56, 0.26 and 0 respectively.

As mentioned previously, the TLCGRIN lens used in the current FINCH configuration has birefringent properties which can limit the useful bandwidth of the system. Birefringent components in an interferometer, in which the two interfered beams have orthogonal polarizations to each other, creates an inherent OPD between the two interfering beams. This OPD puts a limitation on the source bandwidth which can be used in FINCH. However, as we show here, this inherent OPD can be very easily removed. For every birefringent component, the TLCGRIN lens or the phase plate, with ordinary index of refraction $n_o$, extraordinary index of refraction $n_e$ and active LC depth d, the OPD between the ordinary and the extraordinary beams is $|n_e-n_o|d$. According to the Wiener-Khintchine theorem the complex degree of coherence and the source spectrum are a Fourier pair (M. Born and E. Wolf, *Principles of optics* (Cambridge, 1999), Chap. 10.3.2, p. 566). As the OPD is equal to the product of the coherence time and the light velocity, it is clear that a smaller OPD enables using wider bandwidth light sources for the same value of interference visibility, or for the same level of hologram quality. In other words, in order to get a hologram with good fringe visibility all over its area with a light source of bandwidth $\Delta\lambda$ (in terms of wavelengths), the maximum OPD should satisfy the condition $OPD \leq \lambda^2/\Delta\lambda$. Therefore, for a given OPD, an uncorrected configuration of FINCH is limited to light sources with bandwidth not wider than $\lambda^2/OPD$. Considering the birefringent characteristics of the TLCGRIN lens used here, in which $|n_e-n_o|=0.22$ and $d=56$ μm, the source bandwidth is limited to be no more than 25 nm. In order to operate the FINCH with wider bandwidth sources we compensate for, or actually eliminate, the OPD due to the TLCGRIN by introducing into the setup an additional, identical non-active, TLCGRIN lens rotated by 90° to the active TLCGRIN lens. In that case the two beams with the two orthogonal polarizations pass almost the same optical path after passing the two TLCGRIN lenses. It is 'almost' because the ordinary beam, when passing through the active TLCGRIN lens is modulated by a small perturbation in the index of refraction, but the maximum amplitude of this perturbation is negligible in comparison to $n_o$. The OPD due to the phase plate should also be corrected. However because the phase plate is thinner (6.4 μm with the same value of $|n_e-n_o|$), the OPD created by the phase plate is about 9 times shorter and therefore has a much less significant effect on system performance than the TLCGRIN lens. The effect of adding the orthogonally polarized TLCGRIN lens (FIG. 1 GRIN lens 2) to increase the bandwidth of FINCH is shown in FIG. 4. In the absence of this bandwidth compensation, the visibility of the smallest features in group 9 of the USAF slide began to decline with a bandwidth greater than just 1 nm. However with this compensation the effective bandwidth increased to at least 40 nm, more than adequate for fluorescence microscopy. For simplicity we added an inactive GRIN lens to compensate for the birefringence of the active GRIN lens. However any optics with similar birefringence and thickness could be used.

In the current configuration shown in FIG. 1, the opportunity presents itself to add another holography camera (e.g., CAM3, not shown in FIG. 1)) to the s polarization output of BS2 and at distance $z_h$ from the tube lens, allowing the number of exposures to obtain a complex FINCH hologram to be reduced from 3 to 2 increasing the temporal resolution of the system in one instance, and in another instance to increase the signal to noise ratio. For increased temporal resolution, both holography cameras capture holograms simultaneously to produce 4 holograms after only two image captures and two phase shifting steps, with each captured hologram having a different phase shift of π/2 from one another so that the 4 holograms have a total 2π phase shift. This is possible because the beamsplitting prism transfers vector components from the ordinary and the extraordinary axes, 2 projected onto the p axis and 2 onto the s axis. It is easy to see that if the p axis contains the sum of the ordinary and extraordinary components, the s axis contains the difference of those components and vice versa. The final effect is that the two holograms captured simultaneously are phase shifted π from each other. The fringe patterns recorded on both cameras are identical except for the phase difference of π between them. Therefore, when the phase angle on the phase plate is 0, the hologram in CAM3 is shifted by π (a half cycle of the fringes) in comparison to the hologram recorded by CAM2. However, when the phase angle on the phase plate is π/2, the hologram in CAM2 is shifted by π/2 (a quarter cycle of the fringes) in comparison to the hologram recorded by the same camera in the first exposure. The hologram on CAM3 is shifted by 3π/2 in comparison to the same hologram recorded in CAM2 in the first exposure. In conclusion for increased temporal resolution there are 4 raw holograms with 4 steps of phase shift, 0, π/2, π, 3π/2, taken only from two exposures, but that yield together, after a simple, well-known digital superposition, a complex valued hologram which is as good as the hologram obtained with 3 exposures and 3 phase shifts. By doing this we shorten exposure time by 1/3 and save 1/3 of the power consumption, without compromising hologram quality. The signal to noise ratio (S/N) can be increased over using a single hologram camera to capture holograms, simply by averaging the complex holograms simultaneously obtained from each of the two cameras without increasing exposure time. In this case, using the second camera can increase the light efficiency by a factor of 2 and the S/N by the square root of the number of complex holograms.

In another configuration of this invention it is possible to replicate the holography detection system on the p axis of the system shown in FIG. 1 by establishing another identical holography detection system with either 1 or 2 more cameras in the s polarization beampath which originates from BS1. In this case CAM2 normally used to view the widefield image would be replaced with an optical setup to obtain holograms similar to that in the p polarization path. With a configuration of 4 cameras a hologram from the microscope can be created with as little as one image capture increasing the throughput of the system by a factor of 3 over the system configured in FIG. 1, wherein three holograms need be captured by a single camera to create a complex hologram. This has considerable advantages in that the sample under observation is exposed to significantly less excitation light (1 exposure versus 3).

Numerous modifications and variations of the present invention are possible in light of the above teachings. It is therefore to be understood that within the scope of the appended claims, the invention may be practiced otherwise than as specifically described herein.

What is claimed:

1. An apparatus configured to produce a Fresnel hologram of an object emitting electromagnetic radiation, said apparatus comprising polarization sensitive transmissive liquid crystal refractive or diffractive elements comprising liquid crystal GRIN lenses or liquid crystal Fresnel lenses.

2. The apparatus of claim 1 wherein the hologram is formed when in combination with a non-polarized optical element.

3. The apparatus of claim 1 wherein the electromagnetic radiation is visible light.

4. The apparatus of claim 1 wherein the electromagnetic radiation is fluorescent light.

5. The apparatus of claim 1 wherein the electromagnetic radiation is X-ray.

6. The apparatus of claim 1 that is free of reflective optics.

7. An apparatus configured to produce a Fresnel hologram of an object emitting electromagnetic radiation, said apparatus comprising polarization sensitive transmissive liquid crystal refractive or diffractive elements, wherein the electromagnetic radiation is split into separate p and s polarization beams and each beam is captured by a separate camera.

8. The apparatus of claim 7 wherein the transmissive liquid crystal refractive or diffractive elements are liquid crystal GRIN lenses.

9. The apparatus of claim 7 wherein the transmissive liquid crystal refractive or diffractive elements are liquid crystal Fresnel lenses.

10. The apparatus of claim 7 in which one of the beams produces a widefield image and the other beam produces the hologram.

11. The apparatus of claim of 7 in which each of the beams creates a respective hologram.

12. The apparatus of claim 11 in which the holograms from each camera are combined to improve a signal to noise ratio of the hologram produced by the other beam.

13. An apparatus configured to produce a Fresnel hologram of an object emitting electromagnetic radiation, said apparatus comprising polarization sensitive transmissive liquid crystal refractive or diffractive elements wherein the transmissive liquid crystal refractive or diffractive elements and a non-polarized optical element are arranged to form, from each incoherent sample point, two converging, orthogonally polarized waves such that that an in-line reference beam and a sample beam interfere to create the hologram.

14. An apparatus configured to produce a hologram of an object emitting electromagnetic radiation, said apparatus comprising polarization sensitive transmissive liquid crystal refractive or diffractive elements comprising liquid crystal GRIN lenses or liquid crystal Fresnel lenses, and input and output polarizing beam splitters.

15. The apparatus of claim 14 wherein a separate hologram is produced by a beam from each beam splitter.

16. The apparatus of claim 15 wherein identical holograms are produced at each beam splitter to increase a signal to noise ratio associated with each said hologram.

17. The apparatus of claim 15 wherein holograms at different phases are produced at each beam splitter to increase hologram imaging speed.

18. An apparatus configured to produce a hologram of an object emitting electromagnetic radiation, said apparatus comprising polarization sensitive devices with birefringent characteristics similar to transmissive liquid crystal refractive or diffractive elements comprising liquid crystal GRIN lenses or liquid crystal Fresnel lenses.

* * * * *